United States Patent
Li et al.

(10) Patent No.: US 10,662,336 B2
(45) Date of Patent: May 26, 2020

(54) CROSSLINKABLE ACRYLATE POLYMER COMPOSITION

(71) Applicant: BASF SE, Ludwigshafen (DE)

(72) Inventors: Lily Li, Shanghai (CN); Jeff Jianfeng Xia, Shanghai (CN); Chunying Erin Liu, Shanghai (CN)

(73) Assignee: BASF SE, Ludwigshafen (DE)

( * ) Notice: Subject to any disclaimer, the term of this patent is extended or adjusted under 35 U.S.C. 154(b) by 242 days.

(21) Appl. No.: 15/113,488

(22) PCT Filed: Jan. 19, 2015

(86) PCT No.: PCT/EP2015/050882
§ 371 (c)(1),
(2) Date: Jul. 22, 2016

(87) PCT Pub. No.: WO2015/110384
PCT Pub. Date: Jul. 30, 2015

(65) Prior Publication Data
US 2017/0029626 A1    Feb. 2, 2017

(30) Foreign Application Priority Data

Jan. 22, 2014 (WO) ................ PCT/CN2014/071127

(51) Int. Cl.
| | | |
|---|---|---|
| C09D 5/00 | (2006.01) | |
| C09J 133/26 | (2006.01) | |
| C09J 133/08 | (2006.01) | |
| C08L 33/26 | (2006.01) | |
| C09D 7/63 | (2018.01) | |
| C09D 7/40 | (2018.01) | |
| C08L 33/08 | (2006.01) | |
| C09D 133/08 | (2006.01) | |
| G09F 3/02 | (2006.01) | |

(52) U.S. Cl.
CPC ............ *C09D 5/002* (2013.01); *C08L 33/08* (2013.01); *C08L 33/26* (2013.01); *C09D 7/40* (2018.01); *C09D 7/63* (2018.01); *C09D 133/08* (2013.01); *C09J 133/08* (2013.01); *C09J 133/26* (2013.01); *G09F 3/02* (2013.01); *C08L 2205/02* (2013.01); *C08L 2205/025* (2013.01); *G09F 2003/0273* (2013.01)

(58) Field of Classification Search
CPC ....... C08L 33/08; C08L 33/26; C09D 133/08; C09D 133/10; C09D 133/12; C09D 7/1233; C09D 5/02
See application file for complete search history.

(56) References Cited

U.S. PATENT DOCUMENTS 6,005,042 A * 12/1999 Desor ............... C08F 291/00
524/460
2005/0009954 A1    1/2005 Gebhard et al.
2007/0219307 A1    9/2007 Yang et al.
2007/0265391 A1   11/2007 Yang et al.
2012/0041545 A1    2/2012 Wyman et al.
2012/0208920 A1    8/2012 De Calmes et al.

FOREIGN PATENT DOCUMENTS

| | | |
|---|---|---|
| CN | 1667063 A | 9/2005 |
| CN | 101210397 A | 7/2008 |
| EP | 1 496 091 A1 | 1/2005 |
| EP | 1 574 533 A1 | 9/2005 |
| EP | 2 284 238 A1 | 2/2011 |
| JP | H09-328502 A | 12/1997 |
| JP | 2001-139830 A | 5/2001 |
| JP | 2002-256202 A | 9/2002 |
| WO | WO 2010/079229 A1 | 7/2010 |

OTHER PUBLICATIONS

International Search Report dated Feb. 24, 2015 in PCT/EP2015/050882.
Second Office Action in CN Application No. 201580005588.2, dated Mar. 5, 2018 (English translation included—16 pages).
First Office Action in CN Application No. 201580005588.2, dated Aug. 25, 2017 (English translation only—8 pages).
Office Action in TW Application No. 104102148, dated Oct. 3, 2018. (English translation included—12 pages).
Notification of Reasons for Refusal in JP Application No. 2016-548095, dated Dec. 3, 2018. (English translation—10 pages).

* cited by examiner

Primary Examiner — Edward J Cain
(74) Attorney, Agent, or Firm — Foley & Lardner LLP

(57) ABSTRACT

The invention relates to a crosslinkable acrylate polymer composition comprising a first polymer having Tg of 50 to 100° C. and a second polymer having Tg of −10 to 25° C., wherein the composition has an acid number of 1-30 mg KOH/g, or the composition has an acid number of 1-39 mg KOH/g and at least one of the first polymer and the second polymer comprises 0.1-5 wt % of monomer units having a crosslinkable functional group based on the weight of the composition, and a primer prepared thereof. The invention also relates to use of said primer for preparing beer bottle label paper.

15 Claims, 4 Drawing Sheets ent of the present invention.

CROSSLINKABLE ACRYLATE POLYMER COMPOSITION

FIELD OF THE INVENTION

The invention relates to a crosslinkable acrylate polymer composition, a primer comprising such crosslinkable acrylate polymer composition, and use of said primer for preparing beer bottle label paper.

DESCRIPTION OF RELATED ARTS

Beer bottle label paper is a kind of vacuum metallization paper which can replace laminated aluminum foil paper and reduce aluminum usage significantly. Currently for returnable beer bottle label paper, the metallization primer is mainly organic solvent based system, and water based system in the market does not give good ink retention property.

CN101210397A disclosed a water based pre-metallization primer for vacuum metallization beer bottle label paper, its preparation method and use, wherein said primer comprises acrylic resin, acrylate resin, vinyl resin, neutralizer, water and additives. However, there is still a need to further improve ink retention property for returnable beer bottle label paper.

It is found that the ink retention property can be improved significantly when crosslinkable acrylate polymer composition with suitable acid number and two glass transition temperatures (Tg) is used in the water based primer, and at the same time the beer bottle label paper still remain good wash-off property, high gloss, good metallization quality, and/or good rub resistance.

SUMMARY OF THE INVENTION

For the purpose of the invention, the invention provides a crosslinkable acrylate polymer composition comprising a first polymer having glass transition temperature (Tg) of 50 to 100° C. and a second polymer having Tg of −10 to 25° C., wherein the composition has an acid number of 1-30 mg KOH/g, or the composition has an acid number of 1-39 mg KOH/g and at least one of the first polymer and the second polymer comprises 0.1-5 wt % of monomer units having a crosslinkable functional group based on the weight of the composition.

The invention also provides a primer comprising said crosslinkable acrylate polymer composition above.

Furthermore, the invention also provides use of said primer above for preparing beer bottle label paper.

EMBODIMENTS OF THE INVENTION

Figure 1:
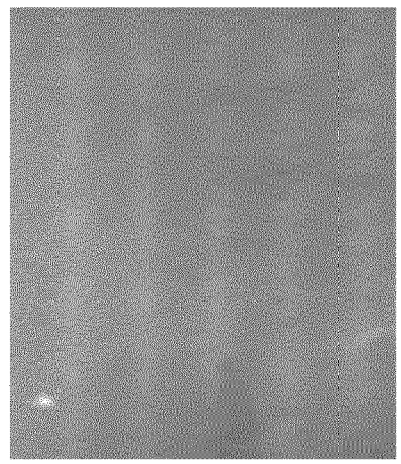
FIG. 1 shows a photograph according to one comparative embodiment.

Specially, the invention provides a crosslinkable acrylate polymer composition comprising a first polymer having Tg of 50 to 100° C. and a second polymer having Tg of −10 to 25° C., wherein the composition has an acid number of 1-30 mg KOH/g, or the composition has an acid number of 1-39 mg KOH/g and at least one of the first polymer and the second polymer comprises 0.1-5 wt % of monomer units having a crosslinkable functional group based on the weight of the composition. In one embodiment of the invention, the composition has an acid number of 1-22 mg KOH/g, preferably 1-11 mg KOH/g.

In the context of this application, the term "crosslinkable acrylate polymer composition" means crosslinkable (meth) acrylate polymer composition.

In one preferred embodiment of the invention, at least one of the first polymer and the second polymer comprises 1-4 wt %, preferably 1-3 wt % of monomer units having a crosslinkable functional group based on the weight of the composition.

In one preferred embodiment of the invention, the first polymer comprises 0.1-5 wt %, preferably 1-4 wt %, more preferably 1-3 wt % of monomer units having a crosslinkable functional group based on the weight of the composition.

In another preferred embodiment of the invention, the second polymer comprises 0.1-5 wt %, preferably 1-4 wt %, more preferably 1-3 wt % of monomer units having a crosslinkable functional group based on the weight of the composition.

In still another preferred embodiment of the invention, both the first polymer and the second polymer comprises 0.1-5 wt %, preferably 1-4 wt %, more preferably 1-3 wt % of monomer units having a crosslinkable functional group based on the weight of the composition.

In one preferred embodiment of the invention, the invention provides a crosslinkable acrylate polymer composition comprising a first polymer having Tg of 50 to 100° C. and a second polymer having Tg of −10 to 25° C., wherein the composition has an acid number of 1-30 mg KOH/g, or the composition has an acid number of 1-39 mg KOH/g and at least one of the first polymer and the second polymer comprises 0.1-5 wt % of monomer units derived from diacetone acrylamide (DAAM), a compound with acetoacetoxy and vinyl group, or combination thereof based on the weight of the composition. Preferably, said compound with acetoacetoxy and vinyl group is 2-(acetoacetoxy)ethyl methacrylate.

The first polymer and the second polymer each independently can comprise monomer units derived from methyl acrylic acid, acrylic acid, itaconic acid, butenoic acid, pentenoic acid, or combination thereof.

In one preferred embodiment of the invention, the first polymer comprises 40-100 wt % hard monomer units and 0-60 wt % soft monomer units and the second polymer comprises 5-35 wt % hard monomer units and 65-95 wt % soft monomer units, said hard monomer units being derived from the group consisting of styrene, methyl methacrylate, alpha methyl styrene, n-butyl methacrylate and ethyl methacrylate and said soft monomer units being derived from the group consisting of butyl acrylate, 2-ethyl hexylacrylate, ethyl acrylate and n-propyl acrylate.

Particularly, the first polymer has Tg of 50 to 80° C., preferably 60 to 80° C., and the second polymer has Tg of −5 to 15° C., preferably 0 to 10° C.

In one preferred embodiment of the invention, the composition has a particle with particle size being 50-120 nm, preferably 60-100 nm, more preferably 70-90 nm.

In one preferred embodiment of the invention, the content of the first polymer is 35-80 wt % and the content of the second polymer is 20-65 wt % based on the weight of the composition. Preferably, the content of the first polymer is 35-75 wt % and the content of the second polymer is 25-65 wt % based on the weight of the composition.

In one preferred embodiment of the invention, the composition can comprise a crosslinking agent. Said crosslinking agent can be any crosslinking agent used to crosslink said composition. One preferred crosslinking agent is adipoyl dihydrazide (ADH). Preferably, the content of the crosslinking agent is 0-2.5 wt %, preferably 0.05-2.5 wt %, more preferably 0.5-2 wt % based on the weight of the composition. More preferably, the content of ADH is usually half of that of DAAM.

In another aspect, the invention provides a primer comprising said crosslinkable acrylate polymer composition above.

In one preferred embodiment of the invention, the primer can further comprise an additive such as coalescent agent, defoamer, wetting agent, wax, water or mixture thereof. Preferably, the content of the additive such as coalescent agent is 0-5% based on the total weight of the primer.

Use of the primer for preparing beer bottle label paper is also included in the scope of the invention.

In one embodiment of the invention, the invention also provide a method for preparing the crosslinkable acrylate polymer composition comprising steps of mixing first polymer and second polymer. Preferably, said method comprises firstly forming the first polymer without further purification, and then forming the second polymer.

In one preferred embodiment of the invention, the polymerization for forming the polymers is an emulsion polymerization. Said emulsion polymerization is carried out in a manner known in the art. Preferably, anionic emulsifier used in the emulsion polymerization can be fatty acid salts such as sodium stearate, sodium oleate and sodium laurate; alkylaryllsulfonic acid salts such as sodium dodecylbenzenesulfonate; alkyl sulfate ester salts such as sodium lauryl sulfate; alkyl sulfosuccinate ester salts such as sodium monoactyl sulfosuccinate, sodium dioctyl sulfosuccinate and sodium polyoxyethylenelauryl sulfosuccinate; polyoxyalkylene alkyl ether sulfate ester salts such as sodium polyoxyethylene lauryl ether sulfate; polyoxyalkylene alkylaryl ether sulfate ester salts such as sodium polyoxyalkylene nonylphenol ether sulfate; alkyl diphenyl ether disulfonates; etc. and the use amount of the anionic emulsifier is about 0.1-4%, preferably 0.5-3%, more preferably 1-2% based on the weight of the total monomers.

Glass transition temperature (Tg) is calculated according to Linear Equation:

$$Tg_{(Polymer)} = Wt\%_1 Tg_1 + Wt\%_2 Tg_2 + \ldots + Wt\%_n Tg_n$$

(Remark: $Wt\%_n$ is the weight content of each monomer based on total monomer, $Tg_n$ is the Tg of homopolymer from each monomer, like $Tg_{(styrene)} = 100°$ C.)

Acid number are calculated according to following equation:

$$AN(mgKOH/g) = (Wt\%_1/Mw_1 + Wt\%_2/Mw_2 + \ldots + Wt\%_n/Mw_n) \times 56100$$

(Remark: Wt % is the weight content based on total monomer of each functional monomer which includes acid group, Mw is the equivalent mole molecular weight of each functional monomer, like $MW_{(Acrylic\ acid)} = 72$, $Mw_{(Itaconic\ acid)} = 65$ since Itaconic acid has two carboxylic acid group)

The particle size is measured by dynamic light scattering (DLS) particle size analyser like Malvern Nano ZS90.

All percentages are mentioned by weight unless otherwise indicated.

EXAMPLES

The present invention is now further illustrated by reference to the following examples, however, the examples are used for the purpose of explanation and not intended to limit the scopes of the invention.

Comparative Example 1

Charge 462.9 g deionized water and 34.2 g Disponil LDBS (23%) in 2 liter 4-necked flask equipped with a stirrer, nitrogen purge inlet, condenser, and additional funnels. The charge was heated to 85° C.; Then feed 34.8 g aqueous sodium persulfate solution (10%) in 150 minutes, and feed monomer mixture of 134.3 g n-butyl acrylate, 43.5 g 2-ethyl hexyl acrylate, 239 g styrene, 4.8 g Diacetone acrylamide, 13.1 g acrylic acid in 150 minutes. After feeding all the monomers and initiator (i.e. the aqueous sodium persulfate solution), add 7.2 g ammonia (20%) below 50° C., then add 26.2 g aqueous adipoyl dihydrazide solution (10%) below 40° C., and then collect product. Its acid number is 23 mgKOH/g, Tg is 29(° C.), and particle size is 78 nm.

Example 1

Charge 462.9 g deionized water and 34.2 g Disponil LDBS (23%) in 2 liter 4-necked flask equipped with a stirrer, nitrogen purge inlet, condenser, and additional funnels. The charge was heated to 85° C. Then feed 34.8 g aqueous sodium persulfate solution (10%) in 150 minutes, and feed monomer mixture 1 of 134.3 g n-butyl acrylate, 24.2 g 2-ethyl hexyl acrylate, 73.1 g styrene, 7.2 g acrylic acid in 90 minutes and monomer mixture 2 of 19.3 g 2-ethyl hexyl acrylate, 165.9 g styrene, 4.8 g Diacetone acrylamide, 5.9 g acrylic acid in 60 minutes; After feeding all the monomers and initiator, add 7.2 g ammonia (20%) below 50° C., then add 26.2 g aqueous adipoyl dihydrazide solution (10%) below 40° C., and then collect product. Its acid number is 23 mgKOH/g, Tg & Ratio is −3/67(° C.) (55%/45%, wt/wt), and particle size is 78 nm. Note: said ratio of (i.e. 55%/45%, wt/wt) means a ratio of polymer derived from mixture 1 to polymer derived from mixture 2.

Preparation of Primer

Two primers are prepared by using polymers according to comparative example 1 and example 1 respectively, and the primer formulation and the process are described as follows.

Primer Formula (with 30 wt % non-volatile):

| | |
|---|---|
| Polymer (45 wt % non-volatile) | 66.6 g |
| Coalescent agent (Dipropylene glycol monomethyl ether) | 2 g |
| Defoamer (FoamStar SI 2292) | 0.5 g |
| Wetting agent (Hydropalat WE 3475) | 0.5 g |
| $H_2O$ | 30.4 g |
| Total | 100 g |

Preparation process: Mix the polymer with $H_2O$, then add the coalescent agent, defoamer, wetting agent respectively under stirring.

Then prepare label sample with the primer above and test ink retention and gloss according to the following process, wherein ink retention and gloss are measured according to DIN 16524-7.

Preparation of Label Sample

Step 1: Apply pre-metallisation primer on beer label paper and dry at 90° C. for 30 sec wherein dry deposit is around 2 g/m².

Step 2: Metallization by HHV AUTO 306 machine, aluminum thickness is about 25 nm.

Step 3: Apply post-metallization primer on the aluminum layer and dry at 90° C. for 30 sec wherein dry deposit is around 1 g/m².

Step 4: Apply gravure ink on post primer and dry at 90° C. for 30 sec.

Step 5: Cut the label sample into 7*7 cm² pieces, then soak it in a 2.5% sodium hydroxide solution for 20 min at 85° C. to check ink retention.

Step 6: Test gloss of each layer by BYK glossmeter.

Figure 2:
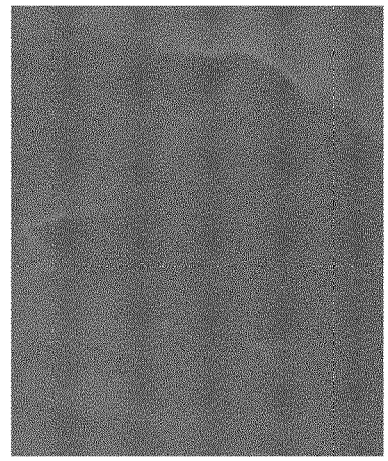
FIG. 2 shows a photograph according to one embodiment of the present invention.
Figure 3:
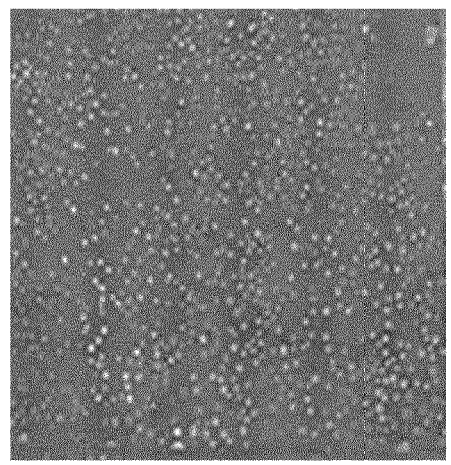
FIG. 3 shows a photograph according to one embodiment of the present invention.
Figure 4:
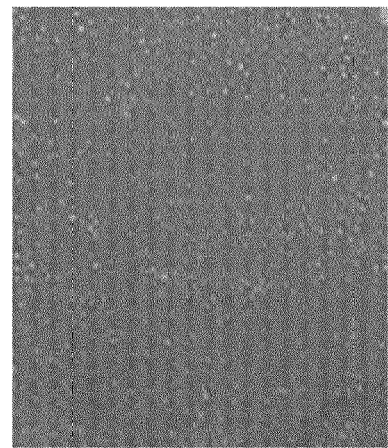
FIG. 4 shows a photograph according to one embodiment of the present invention.
Figure 5:
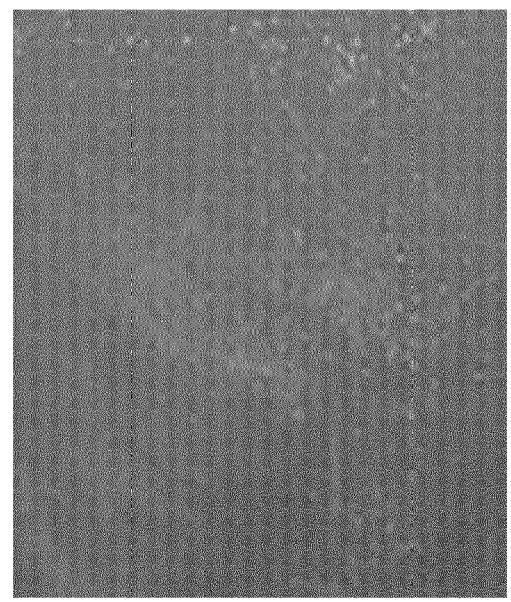
FIG. 5 shows a photograph according to one embodiment of the present invention.
Figure 6:
FIG. 6 shows a photograph according to one comparative embodiment.

Metallization quality effect of comparative example 1 and example 1 are shown in FIG. 1 and FIG. 2, respectively. It can be seen that metallization quality according to example 1 is improved significantly compared to comparative example 1. More specifically, FIG. 1 shows that the surface is foggy, while FIG. 2 does not show foggy surface. It indicates that metallization quality effect using crosslinkable acrylate polymer composition of the invention is better than that only using single crosslinkable acrylate polymer.

Examples 2 to 4 and Comparative Example 2

Procedure of examples 2 to 4 and comparative example 2 are similar to example 1, except that they have different acid numbers.

TABLE 1

Effect of acid number on ink retention

| | Example 2 | Example 3 | Example 4 | Comparative example 2 |
|---|---|---|---|---|
| Acid number (mg KOH/g) | 11.0 | 22.0 | 39.0 | 78.0 |
| Ink retention | Good | Good | Good | Poor |

Ink retention according to examples 2 to 4 and comparative example 2 are shown in FIGS. 3 to 6, respectively. It was found that ink retention according to examples 2 to 4 is good and ink retention according to comparative example 2 is poor when the acid number is too high.

Examples 5 to 8

Procedures of examples 5 to 8 are similar to example 1, except that they have different particle sizes.

TABLE 2

Effect of particle size on gloss

| | | Example 5 | Example 6 | Example 7 | Example 8 |
|---|---|---|---|---|---|
| Particle size of polymer (nm) | | 92 | 125 | 100 | 79 |
| Gloss | After pre-metallization primer (60°) | 65.3 | 56.7 | 66.2 | 64.9 |
| | After metallization (85°) | 110.0 | 93.7 | 104.0 | 110.0 |

It can be seen that the present examples show excellent gloss.

Examples 9 and Comparative Example 3

Procedures of examples 9 and comparative example 3 are similar to example 1, except that they have different Tg and composition.

TABLE 3

Effect of Tg/composition on metallization quality and gloss

| | | Example 9 | Comparative example 3 |
|---|---|---|---|
| Calculated Tg (° C.) & Ratio of polymer composition | | 0° C./55° C. (35 wt %/65 wt %) | 0° C./53° C. (20 wt %/80 wt %) |
| Gloss | After pre-metallization primer (60°) | 63 | 14.7 |
| | After metallization (85°) | 110 | 56.3 |

Figure 7:
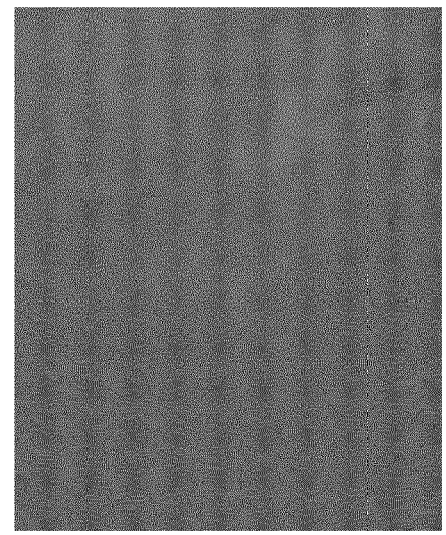
FIG. 7 shows a photograph according to one embodiment of the present invention.
Figure 8:
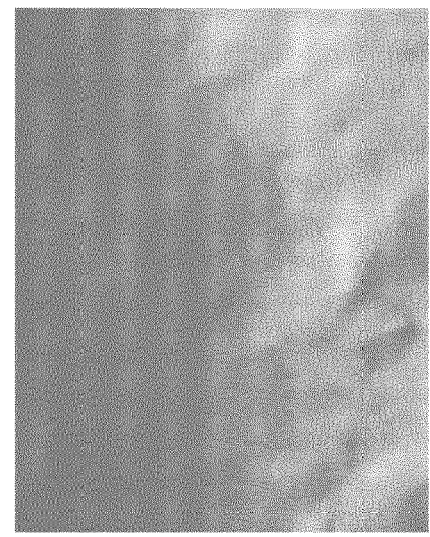
FIG. 8 shows a photograph according to one comparative embodiment.
Figure 9:
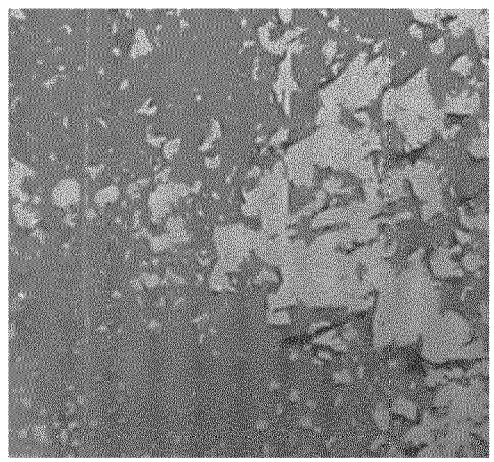
FIG. 9 shows a photograph according to one comparative embodiment.
Figure 10:
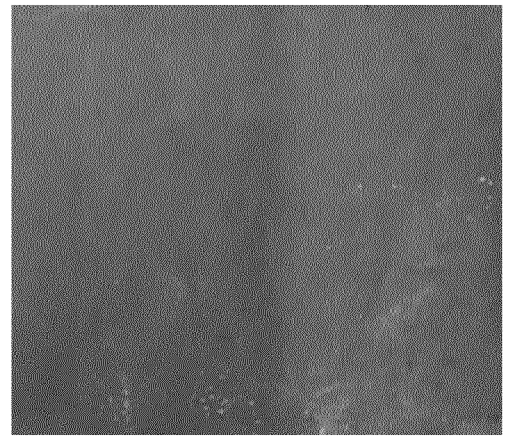
FIG. 10 shows a photograph according to one embodiment of the present invention.
Figure 11:
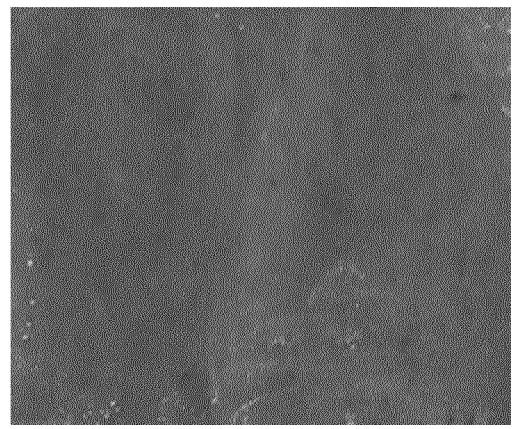
FIG. 11 shows a photograph according to one embodiment of the present invention.
Figure 12:
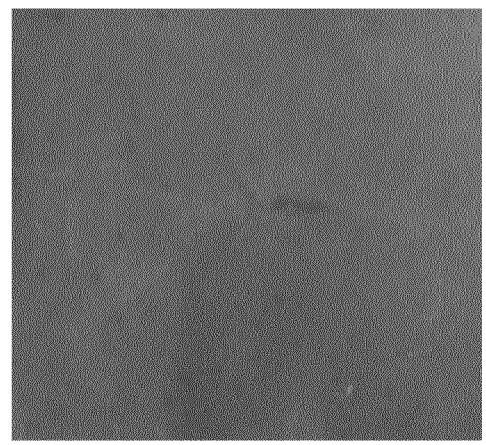
FIG. 12 shows a photograph according to one embodiment of the present invention.

Metallization quality and gloss effect according to example 9 and comparative example 3 are shown in FIGS. 7 and 8, respectively. It was found that metallization quality and gloss according to examples 9 show only slightly foggy on the surface, and metallization quality and gloss according to comparative example 3 show cracky on the surface.

Examples 10 to 12 and Comparative Example 4

Procedures of examples 10 to 12 are similar to example 1 and have similar particle size and acid number, except that they have different content of diacetone acrylamide.

TABLE 4

Effect of diacetone acrylamide (i.e. monomer for forming crosslinkable group) content on ink retention

| | Comparative example 4 | Example 10 | Example 11 | Example 12 |
|---|---|---|---|---|
| Acid number (mg KOH/g) | 39 | 39 | 39 | 30 |
| Diacetone acrylamide (wt %) | 0 | 2.5 | 5 | 0 |
| Ink retention | poor | good | good | good |

Ink retention according to examples 10 to 12 and comparative example 4 are shown in FIGS. 9, 10, 11 and 12, respectively. It was found that when using diacetone acrylamide, ink retention is good. When not using diacetone acrylamide, the ink retention is also good if the acid number is correct. However, if the acid number is too high, the ink retention is poor when not using diacetone acrylamide.

It will be apparent to those skilled in the art that various modifications and variations can be made in the present invention without departing from the scope or spirit of the invention. Thus, it is intended that the present invention cover such modifications and variations as come within the scope of the appended claims and their equivalents.

The invention claimed is:

1. An article comprising a beer bottle label paper, aluminum, and a primer composition, wherein the primer composition comprises a crosslinkable acrylate polymer composition comprising:
   a first polymer having Tg of 60 to 100° C.; and
   a second polymer having Tg of 10 to 25° C.,
   wherein:
      the primer composition is a water-based pre-metallization primer composition;
      the first polymer and the second polymer each independently comprising methyl acrylic acid, acrylic acid, itaconic acid, butenoic acid, pentenoic acid, and a combination thereof;
      the first polymer comprises 40-100 wt % hard monomer units and 0-60 wt % soft monomer units and the second polymer comprises 5-35 wt % hard monomer units and 65-95 wt % soft monomer units,
      wherein said hard monomer units are selected from the group consisting of styrene, methyl methacrylate, alpha methyl styrene, n-butyl methacrylate and ethyl methacrylate and said soft monomer units are selected from the group consisting of butyl acrylate, 2-ethyl hexylacrylate, ethyl acrylate and n-propyl acrylate;
      the crosslinkable acrylate polymer composition has an acid number of 1-30 mg KOH/g or the crosslinkable acrylate polymer composition has an acid number of 1-39 mg KOH/g and at least one of the first polymer and the second polymer comprises 0.1-5 wt % of monomer units having a crosslinkable functional group based on the weight of the crosslinkable acrylate polymer composition,
      wherein the monomer units having a crosslinkable functional group are selected from the group consisting of diacetone acrylamide, a compound with an acetoacetoxy group and a vinyl group, and a combination thereof;
      the crosslinkable acrylate polymer composition comprises a crosslinking agent and has a particle with particle size of 50-120 nm.

2. The article according to claim 1, wherein the compound with the acetoacetoxy group and the vinyl group is 2-(acetoacetoxy)ethyl methacrylate.

3. The article according to claim 1, wherein the first polymer has Tg of 60 to 80° C.

4. The article according to claim 1, wherein
   the content of the first polymer is 35-80 wt %, and
   the content of the second polymer is 20-65 wt % based on the weight of the crosslinkable acrylate polymer composition.

5. The article according to claim 1, wherein the content of the crosslinking agent is 0.05-2.5 wt % based on the weight of the crosslinkable acrylate polymer composition.

6. The article according to claim 1, wherein the primer composition further comprises a coalescent agent, a defoamer, a wetting agent, a wax, water or a mixture thereof.

7. The article according to claim 6, wherein the coalescent agent is present in the primer composition and is present in an amount of not more than 5%, based on the total weight of the primer composition.

8. A method of making the article according to claim 1, the method comprising:
   applying the primer composition to a side of the beer bottle label paper;
   applying the aluminum to the primer composition.

9. The article according to claim 1, wherein the crosslinkable acrylate polymer composition has an acid number of 1-22 mg KOH/g.

10. The article according to claim 1, wherein the crosslinkable acrylate polymer composition has an acid number of 1-11 mg KOH/g.

11. The article according to claim 1, wherein at least one of the first polymer and the second polymer comprises 1-4 wt % of monomer units having a crosslinkable functional group based on the weight of the crosslinkable acrylate polymer composition.

12. The article according to claim 1, wherein the second polymer has Tg of −5 to 15° C.

13. The method of claim 8 further comprising applying a post-metallization primer.

14. The method of claim 13 further comprising applying an ink to the post-metallization primer.

15. The method of claim 8, wherein the primer composition is dried prior to applying the aluminum.

* * * * *